United States Patent [19]

Tyler et al.

[11] 4,393,154
[45] Jul. 12, 1983

[54] CURABLE LONG FIBER LOADED RUBBER COMPOSITION AND METHOD OF MAKING SAME

[75] Inventors: Keith A. Tyler; Sidney R. Fix, both of Lincoln, Nebr.

[73] Assignee: The Goodyear Tire & Rubber Company, Akron, Ohio

[21] Appl. No.: 288,702

[22] Filed: Jul. 30, 1981

[51] Int. Cl.³ .................. C08F 36/02; C08L 21/00
[52] U.S. Cl. .................................. 524/12; 524/13; 524/34; 524/70; 524/71; 523/202
[58] Field of Search ............ 260/17.4 R, 17.4 BB, 260/17.4 CL, 23.7 R, 23.7 H, 23.7 N, 23.7 M, 27 BB, 742, 746, 749, 761, 762; 523/202, 207; 524/12, 13, 34, 36, 69, 70, 71, 87, 493

[56] References Cited

U.S. PATENT DOCUMENTS

| | | | |
|---|---|---|---|
| 2,273,206 | 2/1942 | Kuhn | 260/746 |
| 3,697,364 | 10/1972 | Boustany et al. | 260/746 |
| 3,917,501 | 11/1975 | Ferrucci et al. | 260/17.4 R |

*Primary Examiner*—Maurice J. Welsh
*Assistant Examiner*—Nathan M. Nutter
*Attorney, Agent, or Firm*—J. D. Wolfe; R. D. Thompson

[57] ABSTRACT

An improved curable chopped fiber loaded elastomer or plastic composition composed of a blend of about 5 to 50 percent of chopped fiber of up to 1.3 centimeters in length and 95 to 50 percent of particulate unvulcanized elastomer or plastic which is capable of passing a 6 mesh U.S. Standard Screen.

4 Claims, No Drawings

CURABLE LONG FIBER LOADED RUBBER COMPOSITION AND METHOD OF MAKING SAME

TECHNICAL FIELD

This invention relates to a process of making chopped fiber-loaded rubber compositions and to said compositions. More particularly this invention relates to a process for blending about 5 to 50 percent by weight of chopped fibers about 0.4 up to about 1.3 centimeters in length with about 95 to 50 percent by weight of a particulate, unvulcanized rubber capable of passing a 6 mesh U.S. Standard screen and optionally curative and plasticizer to give a curable composition.

BACKGROUND

It is known to add chopped fibers to plastics to reinforce the plastics but in shaping the fiber reinforced plastics the fibers take on certain degrees of orientation in the plane of flow. Consequently the physical properties of fiber reinforced cured shaped plastics are found to be vastly different in the plane of flow versus the position against the plane of flow. To minimize this difference a small amount of mica is used with the chopped fibers as the reinforcing agent, but even this expedient yields a cured product with reduced physical properties relative to the plane of orientation and length of the chopped fibers is limited generally to no more than a quarter of an inch in length if the mica is to be effective.

DISCLOSURE AND PRACTICE OF THE INVENTION

We have discovered that if chopped fibers such as the well known cotton, nylon, rayon, polyester, glass and wood cellulose and related fibers, are mixed with a powdered rubber together with the other additives and fillers, better and more uniform dispersion of the chopped fibers in the rubber matrix is attained than in the conventional non-powdered rubber mix. Also these advantages are obtained with less mixing time and in some cases eliminates mill mixing and results in the production of an entirely Banbury mixed rubber-fiber composite. This method of production of the mix yields a smaller difference in physical properties for areas with the flow versus areas against the flow (greater orientation in one direction is desired in areas against flow of the plastic or elastomer during molding).

Where Banbury mixing is not sufficient it is possible to preblend the powdered rubber, chopped fiber and additives in a blender or similar device prior to Banbury mixing rather than using a mix mill. In many cases this method of compounding results in energy savings.

The powdered rubber or elastomer can be made of any of the well known methods such as grinding in liquid nitrogen, or spray drying to a latex to produce a powder. It is preferred that the particulate, unvulcanized rubber, i.e. the powdered elastomer, be capable of passing a 6 mesh, and preferably a 200 mesh, U.S. Standard screen. Thus this invention can be used and practiced to advantage with any of the powdered rubbers such as the polymers and copolymers of the diolefins of 4 to 10 carbon atoms and the monoolefins such as polyethylene-propylene rubber, the high cis polydiolefin rubbers, viz polybutadiene and polyisoprene or the copolymers of acrylonitrile-butadiene. The chlorinated rubbers such as polychloroprene are particularly useful in this invention.

The nature of this invention can be seen and more readily appreciated by reference to the following representative example where all the parts and percentages are by weight unless otherwise indicated and the test data are expressed as inch/pounds of load or pounds/square foot modulus.

EXAMPLE 1

Commercial neoprene rubber which had been chilled in liquid nitrogen and ground to pass a 6 mesh U.S. Standard screen was used to blend with chopped fibers of 0.6 to 1.0 centimeter in length to make the experimental blend whereas the unground neoprene was used to make the control blend.

The powdered neoprene was mixed with about 1.5 percent curative and 10 percent by weight of chopped cotton fibers having a length of about 0.6 to 1.0 centimeter by a single pass through a laboratory Banbury mixer and the sheet was cured at 172° C. for 30 minutes.

The control mix was made by mixing the nonpowdered neoprene, viz baled neoprene, with the same amount of sulfur curative as was used above, and 10 percent by weight of chopped fiber of about 0.6 to 1.0 centimeter in length by passing three times through the laboratory Banbury mixer. The sheet of this control blend likewise was cured at 172° C. for 30 minutes. Then the cured sheets were used to run Tinius-Olsen stiffness tests at the angle of bend shown in the table of test results below.

| Results of Tinius-Olsen Stiffness Tests | | | | |
|---|---|---|---|---|
| | Load | | | |
| | Control Fiber Orientation | | Powder Blend Fiber Orientation | |
| Degree of Bend | With | Against | With | Against |
| 10° | 6 | 4.5 | 6.5 | 5 |
| 20 | 11 | 7.5 | 12.5 | 9.5 |
| 30 | 15 | 12 | 16 | 13 |
| 40 | 17.5 | 14.5 | 18 | 15 |
| Modulus | Control | | Powdered Blend | |
| 10% | 150 | | 280 | |
| 20 | 260 | | 377 | |
| 30 | 275 | | 384 | |
| 40 | 255 | | 370 | |

The above results demonstrate that better fiber dispersion is obtained with less mix time with the use of a powdered rubber instead of the regular baled sheet or chip. This is true even where the compounded rubbers are loaded with fillers such as Hi Sil type of silica, say at load levels of 5 to 10 percent and higher as desired.

Similar improvements in dispersion of the chopped fibers are obtainable with the other kinds of powdery rubbers using either the well known peroxide curatives such as dicumyl peroxide or the sulfur type curatives in 0.5 to 3 percent amounts.

It is contemplated that the elastomer composition of this invention can contain at least a small, viz one part, to about 100 or more parts of plasticizer per 100 parts of rubber hydrocarbon. The plasticizer can be any of the well known rubber plasticizers of the aliphatic to the aromatic type obtained from petroleum, polyesters and related plasticizers used with rubbers.

While certain representative embodiments and details have been shown for the purpose of illustrating the invention it will be apparent to those skilled in this art that various changes and modifications may be made therein without departing from the spirit or scope of the invention.

We claim:

1. An improved curable chopped fiber loaded rubber composition consisting essentially of a blend of about 5 to 50 percent by weight of chopped fibers of about 0.4 centimeters up to about 1.3 centimeters long, about 95 to 50 percent by weight of particulate unvulcanized rubber being capable of passing a 6 mesh U.S. Standard screen.

2. The composition of claim 1 wherein the composition contains from 0.3 to 5 percent by weight of a curative of the sulfur type.

3. The composition of claim 1 wherein the rubber is polychloroprene.

4. The composition of claim 1 containing at least one part of about 100 parts of a plasticizer.

* * * * *